No. 756,671. PATENTED APR. 5, 1904.
J. J. MATTHEWS.
ACETYLENE GENERATING APPARATUS.
APPLICATION FILED NOV. 3, 1903.
NO MODEL.

Witnesses:
Stephen Ginsta
Fred W. Englert

Inventor:
J. J. Matthews
by Wilkinson & Fisher
his attorneys.

No. 756,671. Patented April 5, 1904.

UNITED STATES PATENT OFFICE.

JOHN JOSEPH MATTHEWS, OF MALDON, VICTORIA, AUSTRALIA.

ACETYLENE-GENERATING APPARATUS.

SPECIFICATION forming part of Letters Patent No. 756,671, dated April 5, 1904.

Application filed November 3, 1903. Serial No. 179,705. (No model.)

*To all whom it may concern:*

Be it known that I, JOHN JOSEPH MATTHEWS, a subject of the King of Great Britain and Ireland, &c., residing at Maldon, in the State of Victoria, Commonwealth of Australia, have invented certain new and useful Improvements in Acetylene-Generator Apparatus; and I do hereby declare the following to be a full, clear, and exact description of the invention, such as will enable others skilled in the art to which it appertains to make and use the same.

The object of this invention is to provide an acetylene-generator apparatus in which all the parts are contained within an outer casing and in which the gas can be purified, cooled, and stored and the carbid conveniently replenished at will.

The gas is made by admitting water automatically to the carbid from time to time when the gas in the storage-bell is depleted by use, the accompanying drawings illustrating the construction of the apparatus.

Figure 1:
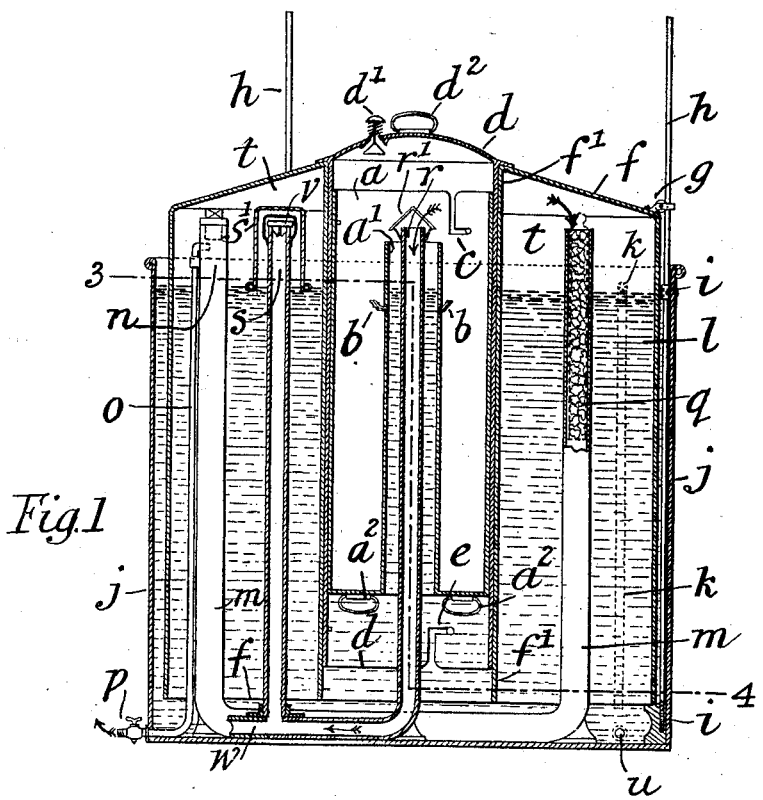
Figure 2:
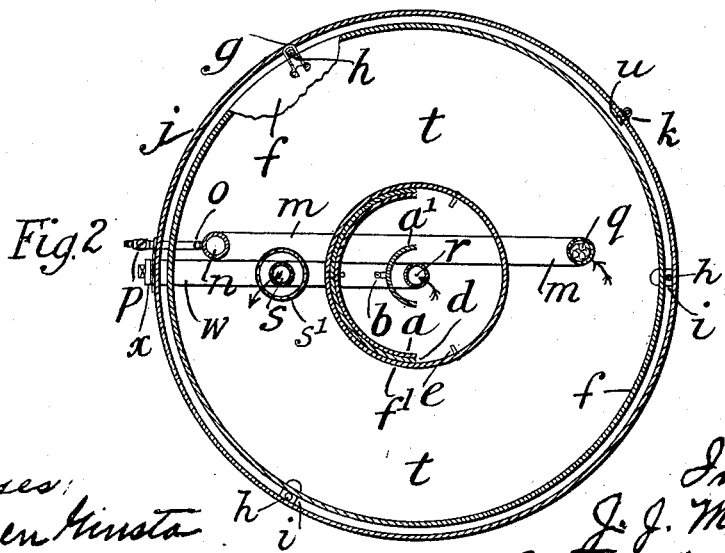

Figure 1 is a side elevation in vertical middle section, and Fig. 2 a plan view in section on line 3 4 of Fig. 1. In Fig. 1 the apparatus is shown charged with water.

The lettering indicates parts as follows, the use of which will be readily understood by those skilled in the art.

$a$ is an annular carbid-chamber open at the top, its inner wall $a'$ being a tube open top and bottom. The carbid in any convenient form (not shown) is put into this chamber when the latter is removed from the rest of the apparatus.

$a^2$ represents handles at the base of $a$; $b$, inlet-pipes to allow entrance of water to the carbid-chamber, the inlets shown being adapted to supply the water high, (to drip onto the carbid;) $c$, a bayonet-joint representing any suitable secure connection of chamber $a$ to chamber $d$ allowing of easy disconnection; $d$, a casing open at the bottom where chamber $a$ is inserted, the internal inclosed space thus formed over the carbid forming a gas-generating chamber; $d^2$, handle of chamber $d$; $d'$, a normally closed vent for allowing escape of air when the gas generation is beginning or of gas, if desired. Usually a spring-valve is here used. The drawings show the valve open for clearer illustration.

$e$ is another connection, which may be a bayonet-joint, as shown, to firmly secure casing $d$ to the bell $f$ in such a way as to allow of easy removal; $f$, an annular gas-storage bell open at the bottom, its inner wall being marked $f'$, open top and bottom. The bell floats in water inside the tank, hereinafter referred to, and rises according to the amount of gas accumulated within it and falls by its weight as the gas is drawn off. Means to regulate the weight may be provided, if desired.

$g$ represents runners, wheels, or the like on the bell $f$ to bear against or engage the guides next mentioned.

$h$ represents guides or uprights, made removable for convenience of transport, suitably held upright, preferably by being screwed at their bases into fixed nuts at the bottom of the tank. These guides steady the bell $f$ as it rises or falls.

$i$ represents means, as nuts and eyes, fixed to the tank to adjust guides $h$ securely in upright position; $j$, a water-tank, usually cylindrical, within which the rest of the apparatus is contained; $k$, an overflow-pipe from tank $j$ to regulate the level of the water therein; $l$, the water in tank $j$, which when the bell $f$ is depressed rises within tube $a'$ until above the level of inlets $b$. When the bell rises, the gas-chamber, comprising parts $a$ to $d$, rises with it till inlets $b$ are above the water-level.

$m$ is a U-shaped tube having a broad base, its parallel limbs forming stand-pipes, one of which only is open at the top, which is above the water-level. This tube is secured at its base to tank $j$ and is located under bell $f$.

$n$ is the top of the closed limb of the gas-purifying stand-pipe $m$, having a plug for convenience in cleaning and inserting purifying material. Tube $m$, being almost wholly immersed in a comparatively large quantity of water, remains cool and accordingly cools the acetylene as it is drawn off.

$o$ is a service-pipe for delivering or drawing off acetylene from the top $n$ of the closed limb of $m$; $p$, cock on pipe $o$ at a part external to tank $j$ to enable the service of gas to be controlled; $q$, any suitable known material placed in tube $m$ (and replenished when necessary) for the purpose of purifying and drying the acetylene before it leaves the apparatus, the material being put, if desired, in a cage which can be easily inserted and removed; $r$, open top (with protecting hood $r'$ to keep out water if poured into the tank carelessly) of inner limb of a U-shaped bell-charging stand-pipe. This pipe is secured at its base to tank $j$. The limb having top $r$ stands within the inner wall $a'$ of chamber $a$ and extends well above the water-level.

$s$ is the top of the outer limb of the bell-charging stand-pipe, the gas (cooled by water) emerging from which is delivered into the space $t$ under bell $f$; $s'$, a hood over the pipe-top $s$, floating on or dipping just below water-level. The hood is used where it is desired to cause the gas to wash itself before reaching space $t$.

$v$ is a valve at the pipe-top $s$, adapted to allow the gas to pass upward from below, the gas-pressure lifting it, while the weight (though slight) of the valve on its seat prevents the gas from returning; $u$, a cock or plug for emptying tank $j$; $w$, a drainage-tube (only partly shown in Fig. 1) leading to the exterior of the tank from the base of the bell-charging stand-pipe; $x$, a plug on the tank exterior to allow of the discharge of any water collecting in tube $w$.

To recharge the apparatus with carbid, chamber $d$ is drawn out of bell $f$, carrying with it chamber $a$, which is then removed, emptied, recharged, and replaced. While drawing out chamber $d$, the valve $d'$ should be depressed to allow air to enter and prevent water being also drawn up to an objectionable extent. The valve $d'$ will, if sufficiently weak, open automatically, because as the combined chambers $a$ $d$ are drawn out the pressure of the atmosphere tends to resist the formation of a vacuum within them. To locate the U-shaped tube-tops in the most advantageous position relatively to the water-level, they are made higher than the edges of the tank.

Arrows show the course taken by the generated gas.

The apparatus is shown in simple form free from liability to get out of order, but variations known in the art may be made within the spirit of the invention.

What I claim as my invention, and desire to secure by Letters Patent of the United States, is—

1. In an acetylene-generator apparatus, the combination with a water-tank having an overflow, of two U-shaped tubes, one of said tubes being adapted to deliver gas from the generating-chamber into the bell, and the other of said tubes being adapted to be filled with purifying material and deliver gas from the bell to the gas-service pipe, a floating gas-bell and, jointed within the same, a gas-generator casing and an annular carbid-chamber having water-inlet pipes inserted within said casing from below, substantially as described.

2. In an acetylene-generator apparatus, the combination with a gas-generating device and an annular gas-bell surrounding the same, of a water-tank having a U-shaped tube fastened to the bottom thereof, the limbs of which tube rise higher than the sides of the tank and are constructed for delivering cooled gas from the generating device to the gas-bell and having a valve to prevent the return of the gas, and another U-shaped tube also secured to the bottom of the tank, the limbs of which project higher than the sides of the tank and constructed to contain purifying material, and a gas-service pipe connected with said second-named U-shaped pipe, said tank also having a drainage-pipe, substantially as described.

3. In an acetylene-generating apparatus, the combination of a tank, a gas-bell floating in said tank, a removable generator-casing constructed to fit into the center of said bell, a valve in the top of said generator-casing, a spring normally holding said valve closed, a U-shaped pipe for delivering gas from said generating-chamber into said bell, said pipe extending above the top of the tank and being provided with a valve to prevent the return of the gas, a second U-shaped pipe fastened to the bottom of the tank and constructed to be filled with purifying material, and a service-pipe connected to said second-named U-shaped pipe, substantially as described.

In testimony whereof I affix my signature in presence of two witnesses.

JOHN JOSEPH MATTHEWS.

Witnesses:
 GEORGE TURIS,
 B. M. LOWE.